United States Patent [19]

Linderman

[11] 4,437,709

[45] Mar. 20, 1984

[54] YOKE APPARATUS

[76] Inventor: Noel Linderman, 227 S. Locust St., McComb, Miss. 39648

[21] Appl. No.: 248,943

[22] Filed: Mar. 30, 1981

[51] Int. Cl.³ .................... F16C 19/50; F16C 19/10
[52] U.S. Cl. .................................. 308/219; 308/173; 308/230; 308/233
[58] Field of Search ............... 308/78, 233, 232, 229, 308/230, 227, 219, 6 R; 403/344, 36; 193/35 R, 37

[56] References Cited

U.S. PATENT DOCUMENTS

| | | | |
|---|---|---|---|
| 643,126 | 2/1900 | Guy et al. | 137/279 |
| 696,973 | 4/1902 | Holmes | 192/99.5 |
| 728,499 | 5/1903 | Reuter | 192/66 |
| 1,796,473 | 5/1929 | Nixon | 308/233 |
| 2,080,042 | 3/1937 | Gregory | 308/230 |
| 4,285,550 | 8/1981 | Blackburn et al. | 308/6 R |

Primary Examiner—Stuart S. Levy
Assistant Examiner—Thomas R. Hannon
Attorney, Agent, or Firm—Keaty & Keaty

[57] ABSTRACT

The present invention provides for a two piece, circular yoke apparatus which would be substantially U-shaped in cross section which is adapted to fit around the flange of a splined coupling to shift the coupling between the splined shafts of a hydro-brake and the draw works of an oil well drilling rig. Also provided would be a plurality of thrust bearings located on the inner side of the edges of the U of the body of the apparatus for engaging the splined coupling as the coupling rotates in its operation. The bearings would serve as a frictionless service for the rotation of the unit, and the edges of the U-body would be provided with channels for allowing a lubricant into the channel made by the edges and back wall of the U-body for maintaining the bearings lubricated during the process. Also provided is a yoke stand, for example a dowel pin type with a saddle type stand or on a screwed and dowel pin type.

4 Claims, 5 Drawing Figures

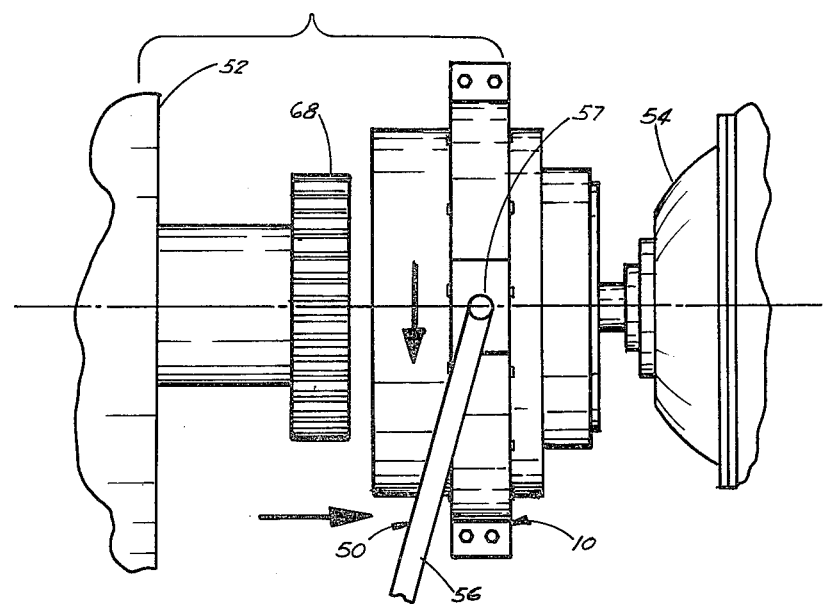
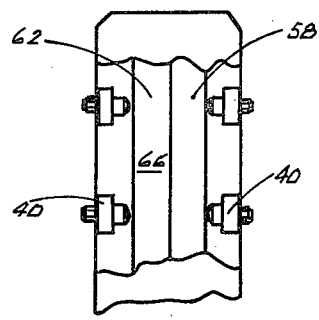
FIG. 3
FIG. 5
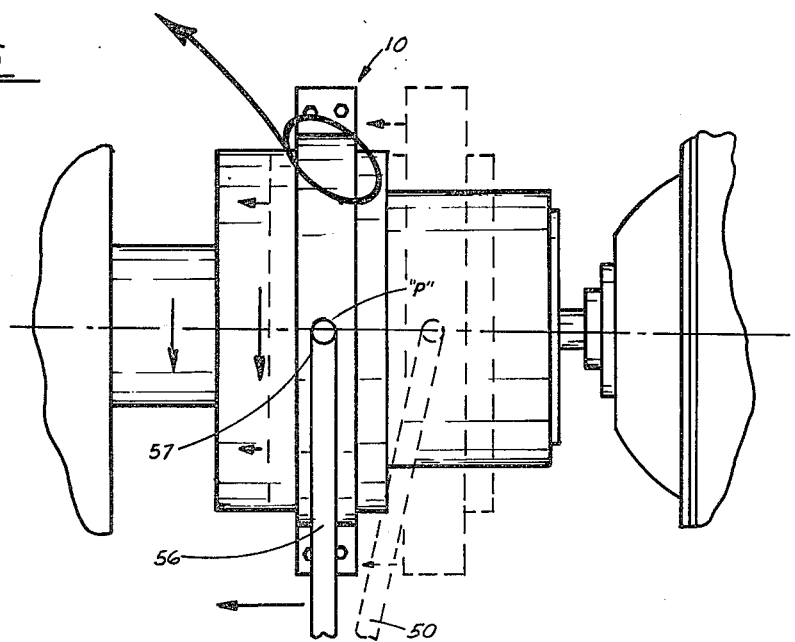
FIG. 4

YOKE APPARATUS

BACKGROUND OF THE INVENTION

1. Field of the Invention

The present invention relates to a "yoke" apparatus for use on an oil drilling platform. More particularly, the present invention relates to a circular yoke apparatus which is adapted to be secured around the flange of a splined coupling to shift the coupling between the splined shafts of the hydro-brake and a draw works on an oil well drilling platform.

2. General Background

In the oil drilling industry, and particularly in the actual drilling process done on the oil rig itself, the primary apparatus for performing the actual rotation of the drilling bits as the oil is being drilled is called the draw works. Also, the draw works is required to support the drilling pipe commonly known as the drill stem during the drilling operation. The hydro-brake acts as a holding brake to slow down the draw works and to hold back a part of the weight of the drill string thus assisting the draw works in its braking and over all control of the drilling operation. This braking apparatus is connected to the draw works through a mating of the hydro-brake shaft and the draw works shaft. When the hydro-brake is unneeded in the drilling operation, one could release the connectable mating of the shafts, and leave the hydro-brake idle while the draw works continued in the drilling operation.

An essential part of the mating of the hydro-brake shaft and the draw work shaft via the splined coupling is the fact that the coupling is housed in a yoke or collar unit. At the present time the type of unit which is utilized is simply a metal collar having inner directed edges which would simply fit around the splined coupling, with the yoke being mounted on a pair of leg or the like supports rigidly attached to the floor. The yoke simply serves as a housing unit for the splined coupling which, when the hydro-brake and the control work shaft are coupled together, the rotation of the shaft imparts rotation of the splined coupling within the yoke housing. In the present state of the art, with the yoke being simply a bare metal collar, the rotation of the splined coupling, which is at times at great speeds, tends to wear away the yoke within 2 to 3 months time on an oil rig, thus requiring that the yoke be changed. At the present time, when the yoke must be changed, the draw works and the hydro-brake must be stopped, the yoke removed and a new yoke put in place. This time spent in changing the yoke, is of course, down time for the rig, which means loss of money and efficiency in the oil drilling process.

In the present state of the art, there are apparently no patented devices which would be utilized in serving as a collar or a yoke splined coupling between a hydro-brake and draw works having the features of our present apparatus.

The following patents were found as being the closest art available:

U.S. Pat. No. 696,973 issued to G. L. Holmes, entitled "Clutch Operating Device" would teach the use of the means and devices for operating clutch mechanisms or form operating mechanisms wherein the part is to be moved to the limits of its excursion and to opposite directions, and is in each case expected to remain securely in the new position. The patent simply discloses a functional stand for lateral movement of a ring device, having somewhat of the structural features of the apparatus in the present invention.

U.S. Pat. No. 643,126 issued to G. G. Guy et al, entitled "Water Crane" discloses the use of a collar and roller or ball bearings in facilitating rotation of the joint.

U.S. Pat. No. 1,796,473 issued to Nixon, entitled "Bearings" and U.S. Pat. No. 728,499 issued to Reuder entitled "Motor Vehicle" disclose the broad concept of providing bearings in a machine element to relieve thrust friction with another machine element held therebetween.

None of the patents as cited or other patents as found in the art, would disclose the use of the yoke apparatus combination with the thrust bearings and means for lubricating the bearings for use with engaging a splined coupling between a drill works and a hydro-brake on a drilling well.

GENERAL DISCUSSION OF THE PRESENT INVENTION

The present invention solves the prior problems and shortcomings in a simple and inexpensive, straightforward manner. The present invention provides for a two piece, circular yoke apparatus which would be substantially U-shaped and cross sectioned which is adapted to fit around the flange of a splined coupling to shift the coupling between the splined shafts of a hydro-brake and the draw works of an oil well drilling rig. Also provided would be a plurality of thrust bearings located on the inner side of the legs of the U of the body of the apparatus for engaging the splined coupling as the coupling rotates in its operation. The bearings would serve as a frictionless service for the rotation of the unit, and would also be provided with a means for maintaining the bearings lubricated during the process. Also provided is a means for interchanging within a type of yoke stand, for example a dowel pin type with a saddle type stand or on a screwed and dowel pin type.

Therefore, it is an object of the present invention to provide a yoke apparatus for engaging the flange of a splined coupling when the coupling shifts between the splined shafts of the hydro-brake and a draw works.

It is a further object of the present invention to provide a yoke apparatus which is easily lubricated and can be maintained over a long period of time.

It is a further object of the present invention to provide an improved yoke apparatus in the splined coupling between the splined shafts of a hydro-brake and the draw works that will reduce the wear on the yoke apparatus by providing a plurality of bearings for serving as a frictionless surface in the rotation of the flange portion.

It is a further object of the present invention to provide a yoke apparatus which is interchangable in the types of yoke stands which are presently utilized on the oil rig drilling units.

BRIEF DESCRIPTION OF THE DRAWINGS

For further understanding of the nature and object of the present invention, reference should be had to the following detailed description taken in conjunction with the accompanying drawings in which like parts are given like reference numbers and wherein:

FIG. 3 illustrates in side view the preferred embodiment of the apparatus of the present invention in position between the draw works and the hydro-brake in the uncoupled state;

FIG. 4 illustrates in side view the preferred embodiment of the apparatus of the present invention in position between the draw works and the hydro-brake in the coupled state;

FIG. 5 is an exploded partial, cut-away view of the apparatus engaging the flanges of the splined coupling.

DETAILED DESCRIPTION OF THE PREFERRED EMBODIMENT

Figure 1:
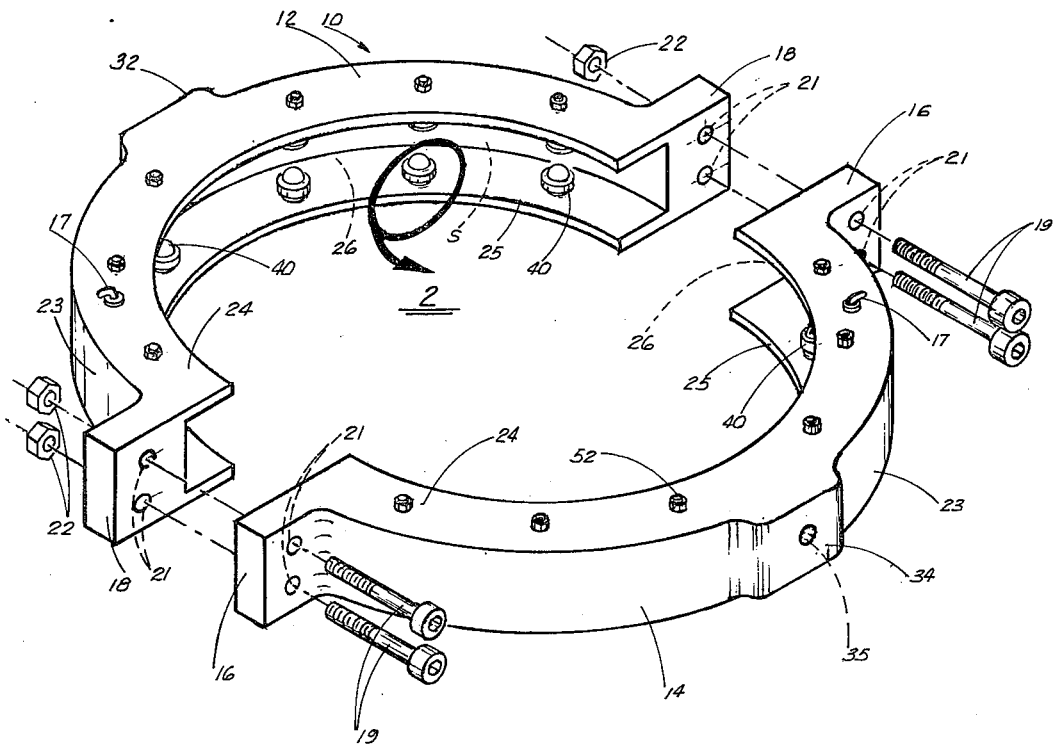
FIG. 1 illustrates a perspective view of the preferred embodiment of the apparatus of the present invention.

FIGS. 1 through 5 illustrate the preferred embodiment of the yoke apparatus of the present invention designated by numeral 10. As seen in FIG. 1, yoke apparatus 10 comprises a first and second substantially U-shaped section 12 and 14, attachable to one another by aligning a shoulder portion 16 at each end of the first U-shaped section 12, with the shoulder portion 18 of the second U-shaped section 14. Bolt 19 would be inserted through mated holes 21 in each of the shoulder portions 16 and 18 of U-shaped sections 12 and 14, with bolt 19 being threadably engaged to nut 22 in tight engagement thus securedly fastening together first U-shaped section 12 to second U-shaped section 14 thus definining the entire circular yoke apparatus 10. In the preferred embodiment, a pair of bolts 19 through each shoulder portion 16 and 18 would be sufficient to securedly engage the half sections 12 and 14 in rigid engagement to one another.

As further illustrated in FIG. 1, each yoke U-shaped section 12 and 14 comprises a back wall portion 23 integrally formed with a pair of side portions 24 and 25, at substantially right angles to said back portion 23, defining therewithin a channel 26, the function of which will be discussed further. Upon the mating of U-shaped section 12 and 14, the back portion 23 and side portions 24 and 25 integrally mate so that channel 26 becomes a continuous channel within the entire circumferential distance of yoke 10, open ended on its inside portion 26, to receive the flanges of a splined coupling during use.

Further adapted to each half portion 12 and 14 is receiver portion 32 and 34 respectively. Each receiver portion 32 and 34 defines a thickened portion of backwall 23, approximately 4 inches square, in the preferred embodiment, and bored therein with port 35. Port 35 would receive a dowel pin or the like from stand 50, as illustrated in FIGS. 3 and 4, during the operation of yoke 10. Portion 32 and 34 by necessity must be reinforced by thickening so that the yoke is properly supported onto stand 50 during operation. Preferably, port 35 would be to a depth less than the thickness of the thickened portion 32 and 34. Also, the position of receiver portions 32 and 34 are exactly half the distance along the circumferential distance of back portion 23, to prevent the yoke from being imbalanced during use, and providing it be maintained in the upright position.

Figure 2:
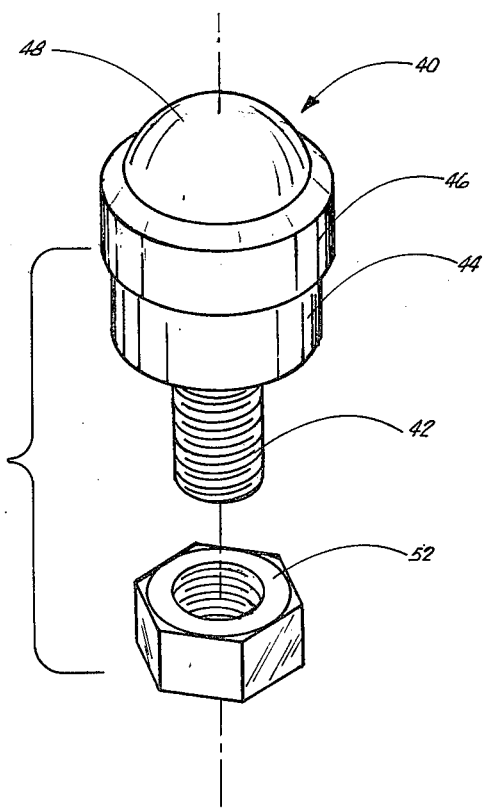
FIG. 2 illustrates an exploded view of a bearing race portion of the preferred embodiment of the apparatus of the present invention.

Further illustrated in FIG. 1, and in exploded view in FIG. 2, is a plurality of bearing races 40 which engage the side wall portions of yoke 10, throughout its circumference, preferably equally spaced. In the preferred embodiment, bearing races 40 would comprise bolt portion 42 for insertion into a hole through sidewalls of yoke 10. Integrally attached at its approximate end portion to bolt portion 42 is base 44 bearing race 40 which is intermediate bolt 42 and bearing collar portion 46, which would house bearing 48. Engaged with collar 46 is bearing 48, which is a standard, high quality steel bearing, capable of withstanding pressure of approximately 20,000 P.S.I. Bearing race 40 would be threadably engaged into sidewalls 24 and 25 with nut 52 secured to its distal end of bolt 42 engaging sidewall 24 and 25 between base portion 44 and bolt 42 for rigidly engaging each race 40 thereto side portions 24 and 25.

Preferably, as seen in FIG. 1, race 40 would be spaced at equal distances along the circumferential distance of yoke 10. With the race 40 placed within channel 26 and bolt, so that bolt 42 and a nut 48 would be placed on the exterior of yolk 10.

In the preferred embodiment, a bearing race 40 would be so placed so that, each bearing race on wall portion 24 would be directly opposite a bearing race on wall portion 25. This positioning of bearing races 40 directly opposite one another affixed to wall portions 25 and 24 are required, so that in the operation of the yoke apparatus, the flanges of the splined coupling, as further illustrated in FIG. 5, must be engaged between the race 40 and the most secure engaging would be the positioning of the races directly opposite one another in communication with the flanges 58 and 62 of splined coupling 66 in contact with bearings 48 of bearing race 40. The width of back wall portion 23 would be such that it would provide for a space S between each pair of races 40 which would be directly opposite one another, to accommodate the width of the splined couplings 66 as illustrated in FIG. 5.

FIG. 3 illustrates the position of yoke 10 as attached to stand 50, intermediate drill works 52 and hydro-brake 54. As illustrated in FIG. 3, yoke 10 is supported by stand 50, which would generally comprise a base portion (not shown) secured to the floor or the like base and having a pair of arm portions 56, each adapted with a dowel 57 for engaging port 35 of yoke 10 at point P. As seen in FIGS. 3 and 5, flange portions 58, hydro-brake 54, and flange portion 62 of drill works 52 would form a splined coupling unit 66, the coupling 66 engaged between the spaced pairs of bearing races 40 as seen in FIG. 5.

Yoke 10, in the preferred embodiment, would be placed around the flanged portions 58 and 62 comprising coupling 66 as splines 68 are disengaged from drill works 52. The disengagement of splines 68 of coupling 66 is illustrated in FIG. 3, with yoke 10 engaging the coupling in the uncoupled state. In FIG. 4, yoke 10 and coupling 66 is shifted so that spline 68 engage hydro-brake 54, and the flange engagement as seen in FIG. 5 rotate within yoke 10. The maneuverability of stand portion 50 and yoke 10 is illustrated in drawing in FIG. 4, as splined 68 engage and disengage hydro-brake 54.

As seen in FIG. 5, yoke 10 provide bearing races 40 to serve as a relatively frictionless surface during the increasingly high speeds encountered by the rotation of the splined coupling 66, with bearing races 40 engaging the flanged portions 62 and 58 of splined couplings 66. In order to increase the life of yoke 10, FIG. 1 illustrates oil port fixture 17 which is adapted to receive a lubrication line for example, for lubricating the channel 26 of yoke 10, especially during the operation of the yoke apparatus.

In the preferred embodiment, yoke 10 could be constructed to various diameters and weights to accommodate various coupling sizes. The preferred embodiment foresees use between the splined coupling of the hydrobrake and the drill works; however, uses in various coupling types, wherein a frictionless stable yoke is required to maintain the integrity of the coupling, can be foreseen in the utilization of this apparatus.

Further, the apparatus is capable of being easily replacable and the bearing races being as easily replacable in the event a bearing race fails during use. However, because of the construction and design of the apparatus 10, the apparatus 10 is capable of withstanding long periods of use, without breakdown, as described heretofore.

What is claimed as invention is:

1. A yoke collar apparatus for use with splined couplings, comprising:
    a. a substantially circular yoke body, having a first U-shaped half section and a second U-shaped half section, said first and second U-shaped half sections connectable to one another;
    b. a pair of parallel edge portions integrally connected in perpendicular relationship to the back portion of each of said U-shaped sections, said pair of edge portions and said back portion defining an open ended continuous circular channel means within said yoke body;
    c. a plurality of roller bearing means, each individually mounted in equally spaced openings on the inner surface in said edge portions and extending into said channel means for engaging a rotatable body within said channel, providing a substantially frictionless surface between said rotatable body and said bearing means, each bearing means of one edge portion being positioned opposite a bearing means of the second edge portion.

2. The apparatus in claim 1, further comprising lubricating means mounted on the exterior of said edge portions and communicating with said channel means.

3. A yoke apparatus, for securing a splined coupling between a hydro-brake and the drill works of and oil drilling platform, comprising:
    a. a substantially circular yoke body, having a first U-shaped half section and a second U-shaped half section, said first and second U-shaped half sections connectable to one another;
    b. a pair of identical parallel edge portions integrally connected in perpendicular relationship to the back portion of each of said U-shaped portions, said edge portions and said back portion, when said first U-shaped section and said second U-shaped section are connected, defining a continuous open-ended channel means within said yoke body, along the entire circumference of said yoke body;
    c. a plurality of race bearing means, each individually and fixedly mounted in equally spaced openings on the inner surface in said pair of edge portions and extending into said channel means for engaging a splined coupling within said channel, providing a substantially frictionless surface between said splined coupling and said race bearing means;
    d. lubricating means mounted on the exterior of said edge portion, and communicating with said channel means, for supplying lubrication during the rotation of said splined coupling.

4. The apparatus of claim 3, wherein said race bearing means mounted on said inner surface of said pair of in the openings in said edge portions are aligned in pairs opposite one another along the entire circumference of said yoke body.

* * * * *